UNITED STATES PATENT OFFICE.

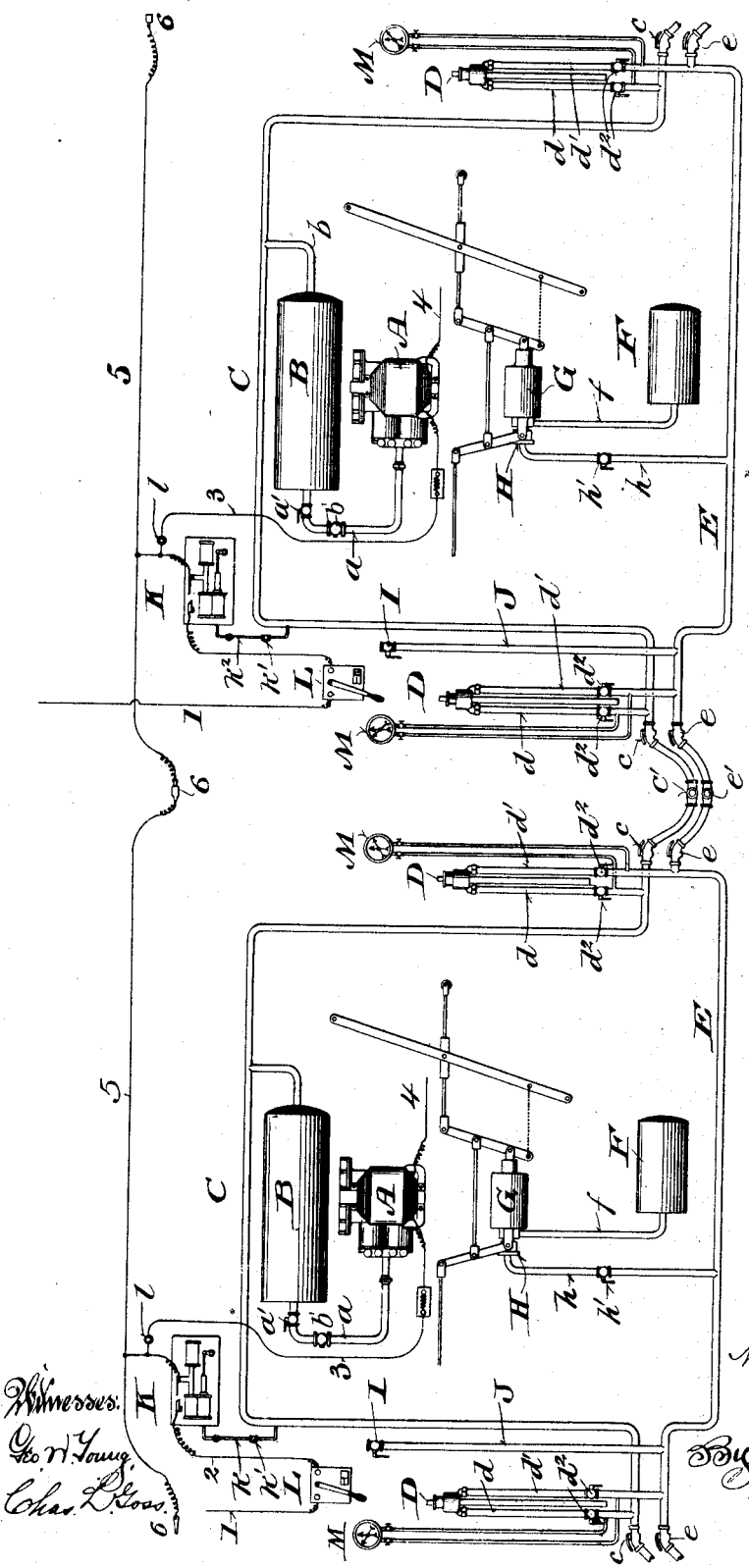

NIELS A. CHRISTENSEN, OF MILWAUKEE, WISCONSIN.

AIR-BRAKE.

SPECIFICATION forming part of Letters Patent No. 668,613, dated February 19, 1901.

Application filed June 12, 1899. Serial No. 720,139. (No model.)

*To all whom it may concern:*

Be it known that I, NIELS A. CHRISTENSEN, a subject of the King of Denmark, residing at Milwaukee, in the county of Milwaukee and State of Wisconsin, have invented certain new and useful Improvements in Air-Brakes, of which the following is a specification, reference being had to the accompanying drawing, forming a part thereof.

My invention relates particularly to that class of air-brake apparatus which is designed for use on electric railways and in which the compressed air for operating the brakes is supplied by electrically-actuated compressors.

The main objects of the invention are to control by a single engineer's valve all the brakes of a number of connected motor-cars each of which has a complete air-brake equipment capable of separate and independent operation, to utilize the compressors of all or a number of connected motor-cars for supplying the pressure to operate the brakes of the entire train and thus to avoid providing such cars with compressors of a larger size and greater capacity than is required for the operation of the brakes of a single car, to provide for stopping and starting all the compressors at the same time, to produce and maintain the same pressure in the main reservoirs of the several connected cars, and generally to adapt air-brake apparatus for operation on cars to be run separately or connected in a train, or in what may be conveniently designated a "multiple unit system," in which the several individual brake equipments are connected and operated as one.

It consists in certain novel features in the construction and arrangement of component parts of the apparatus, as hereinafter particularly described, and pointed out in the claims.

The accompanying drawing is a diagrammatic illustration in condensed space of the air-brake equipment of two cars constructed, arranged, and connected in accordance with my invention.

In the operation of electric railways it is frequently necessary or desirable to run motor-cars both separately and connected together in trains. To this end each individual car should be equipped with complete air-brake apparatus capable of independent operation and also capable when connected with the air-brake equipment of other cars of operating as a part of a single system. When the air-brake equipments of several cars are thus connected in a single system, the apparatus should be so constructed, arranged, and connected that the brakes on all the cars can be controlled by an engineer's valve on the front or any car of the train and can be simultaneously and equally applied and released on all the cars, both in service and emergency applications. It is also desirable when a number of cars are so connected and run together to utilize all or a number of compressors for supplying the entire system with compressed air, so that it will not be necessary for this purpose to provide individual cars with compressors and main reservoirs of larger size and capacity than are required for the operation of the brakes on single cars.

According to my multiple unit system of control each car is provided with a complete air-brake equipment, including air-compressor, automatic controller, main reservoir, engineer's valves, triple valve, brake-cylinder, and auxiliary reservoir. These several parts, which may be of well-known or any suitable form and construction, are, together with other parts essential to a multiple unit system, arranged and connected as follows.

Referring to the accompanying drawing, illustrating the complete air-brake equipment of two cars, it will be necessary to describe specifically the equipment of but one car, since each is a duplicate of the other.

A designates the compressor, which in the present case is combined with and operated by an electric motor supplied with current from the trolley-conductor.

B is the main reservoir, connected at one end by a pipe $a$ with a compressor and at the other end by a branch pipe $b$ with pipe C, which may be called the "main-reservoir" pipe, extending the entire length of the car and provided at its ends with cut-off cocks $c\ c$ and with hose sections and couplings $c'$ for connecting it with the corresponding pipes and the main reservoirs of other cars.

D D are the engineer's valves, with two of which each car is usually and preferably provided, one valve being located on the platform or in the vestibule at each end of the car. Each engineer's valve is connected by a branch pipe $d$ with the main-reservoir pipe C and by a branch pipe $d'$ with the train-pipe E. These branch pipes are provided above the platform with cut-out cocks $d^2$. The train-pipe E, extending the entire length of the car, is provided at the ends with cut-out cocks $e$ $e$ and with flexible hose-sections and pipe-couplings $e'$ for connecting it with corresponding pipes on other cars.

F is the auxiliary reservoir, and G the brake-cylinder, connected in the usual way through a triple valve H and by a branch pipe $h$ with the train-pipe E and by a branch pipe $f$ with the auxiliary reservoir F.

I is a conductor's valve, connected by a branch pipe J with the train-pipe E and conveniently located for releasing air from the train-pipe and applying the brakes in case of emergency.

K is an automatic controller, which is adapted to open and close the motor-circuit, according to the pressure in the main reservoir, in such a way that when the pressure falls below the desired limit the circuit will be closed and the compressor will force air into the main reservoir, and when the pressure therein reaches the desired limit the circuit will be opened and the compressor stopped. The automatic controller is connected by a pipe $k$, provided with a cock $k'$, with the main-reservoir pipe C.

L is a cut-out switch placed in the canopy at one end of the car. One terminal of this switch is connected with the trolley-conductor 1, and the other terminal is connected by a conductor 2 with one contact of the controller K, the other contact of said controller being connected by a conductor 3 with one terminal of the compressor-motor, while the other terminal of said motor is connected with the ground or return conductor 4. The automatic controller K may, however, be located on the ground or return side of the compressor-motor.

$l$ is a small cut-out switch located in the circuit between the automatic controller and the compressor-motor.

The pipe $a$, connecting the compressor with the main reservoir B, is provided with a cut-out cock $a'$ and with a check-valve $b'$, which closes toward the compressor and prevents depletion of the main-reservoir pipe and the main reservoirs in case a break or leak occurs in any compressor or pipe $a$. The branch pipe $h$, connecting the train-pipe E with the triple valve H, is provided with a cut-out cock $h'$, by means of which the triple valve, brake-cylinder, and auxiliary reservoir are disconnected from the train-pipe whenever occasion requires for inspecting or repairing these parts of the apparatus.

While any well-known engineer's valve suitable for automatic service may be employed, an engineer's valve which is provided with an automatic regulating-valve for maintaining a higher pressure in the main reservoir than in the train-pipe and admitting air from the main reservoir to the train-pipe when the engineer's valve is in release or running position is preferably used in my multiple unit system of control. As engineer's valves having such provision are well known and do not of themselves constitute a part of the present invention, it is not necessary to particularly illustrate and describe their construction and mode of operation.

M M are pressure-gages associated with the engineer's valves in the vestibules or on the platforms of the car and connected with both the main-reservoir pipe C and the train-pipe E or with the branches $d$ and $d'$, connecting said pipe with the engineer's valves.

5 is a wire, which may be designated as a "balancing-wire," extending through the car from end to end and provided at its ends with couplings 6 for connecting it with corresponding wires of other cars. It is connected with the compressor-motor circuit between the compressor and the automatic controller.

My improved apparatus operates as follows: When a car equipped with the apparatus is run alone independently of other cars, the cut-out cocks $c$ and $e$ at the ends of the main reservoir and train-pipes are closed and the engineer's valve, which is not to be used, is placed on lap, and the cut-out cocks $d^2$, associated therewith, are closed. By closing the canopy-switch L when the trolley-conductor 1 is supplied with current the compressor A will be started, provided the pressure in the main reservoir is below the minimum limit at which the automatic controller K is adjusted to close the circuit, and will continue to run and force air into the main reservoir until the pressure therein reaches the maximum limit at which the controller is adjusted to open the circuit. When such maximum limit is reached, the circuit will be broken and the compressor will stop and remain quiescent until the pressure in the main reservoir falls below the minimum limit, whereupon the circuit will be again closed by the automatic controller, the compressor started, and the pressure in the main reservoir restored, as above explained. The brakes are controlled by means of the engineer's valve at either end of the car, both in service and emergency applications, and in release according to the well-known practice in the operation of automatic air-brake systems employed on steam-railways. When a number of cars are connected and are to be run in a train, the main reservoir and train-pipes C and E and the balancing-wires 5 of the several cars are connected, as shown in the drawing, thus producing a single air-brake system which may be controlled and operated by either of the engineer's valves on any of the several connected cars, according to the customary practice on steam-railways. When a number of cars thus equipped are coupled together, as above mentioned, all of the engineer's valves except that by which the entire system is to be controlled and operated are placed on lap and the associated cocks $d^2$ are closed. The cocks $c$ and $e$ at the ends of the train are also closed, while the corresponding cocks between the several cars are opened, thus establishing free communication between the main-reservoir pipes C and between the train-pipes E of the several cars. With the relative arrangement of the compressors A and the automatic controllers K (shown in the drawing) one or all of the canopy-switches L may be closed, any one of said switches, in connection with the balancing-wires 5, affording means for manually controlling the supply of current to all the compressor-motors of the system. Assuming that the pressure in the main reservoirs, which is equalized by their connection with each other through the connected pipes C, is below the minimum limit and the motor-circuits through all the controllers are closed, when a canopy-switch is closed current will flow through all the compressor-motors, which will work simultaneously to raise the pressure in the main reservoirs. As the pressure reaches the maximum limits at which the several controllers are adjusted to open the circuit the trolley connections will be opened; but current will be supplied to all the motors through their connections with the balancing-wires 5 until the last controller, which is adjusted to break the circuit at the highest maximum limit, operates to open the trolley connection supplying current to the entire air-brake system. As the controller, which is adjusted to close the circuit at the highest minimum limit, will be closed when the main-reservoir pressure falls, before any of the other controllers which are adjusted for lower minimum limits are operated, it will, as long as it is supplied with current through the associated canopy-switch and trolley connection, control the entire system and the other controllers will remain open and inoperative. If, however, such controller should become disabled or be cut out by the associated canopy-switch, the controller which is adjusted to open the circuit at the next highest minimum limit would then assume control of the system to the exclusion of other controllers adjusted for lower minimum limits. In this way while all of the controllers are in condition to be brought into service, if required, the entire system is controlled by only one of them, and all the compressors are stopped and started simultaneously, thus equally dividing the work between them.

The automatic controllers K may be located on the ground or return side of the compressor-motors and the balancing-wires 5 connected with the wires 4 between said controllers and motors. In this case it is necessary to close the trolley connection by means of the associated canopy-switch for each of the several compressor-motors that are to be operated in the multiple unit system, since with this arrangement the balancing-wires will not supply current to the compressor-motor on any given car from the trolley connection on another car, but will afford a common ground or return connection for all the motors as long as any one of the automatic controllers remains closed. In this way, as in the case first explained, all the compressor-motors which have closed trolley connections will be stopped and started at the same time.

When the apparatus is arranged, as shown and described, for automatic service—that is, when the cars are provided with auxiliary reservoirs and triple valves and provision is made for charging and maintaining the required pressure in the train-pipes from the main reservoirs when the controlling engineer's valve is in release or running position—the operation of the apparatus as a multiple unit system is like or similar to that of automatic air-brake systems in general use on steam-railways, with the exception that the compressed air is supplied by a number of compressors and main reservoirs instead of by a single compressor and main reservoir. The train-pipes E of the several cars being connected and communicating freely with each other, a single engineer's valve suffices to control the entire system, both for service and emergency applications of the brakes, and the pressure in the train-pipes on the several cars being equal the brakes on the several cars will be applied simultaneously with equal force and will also be released simultaneously.

The apparatus may be adapted for "straight air"—viz., the operation of the brakes by the admission and release of main-reservoir air to and from the brake-cylinders through the train-pipes under the direct control of an engineer's valve—by dispensing with the auxiliary reservoirs and triple valves and the regulating-valves for automatically admitting air from the main-reservoir pipes to the train-pipes when the engineer's valves are in release or running position. In this case the electrical connections, hereinbefore described, serve to stop and start all the compressors at the same time and to distribute the work equally between them, and the main-reservoir connections serve to equalize the pressure therein.

The several gages M indicate, in the usual way, both main-reservoir and train-pipe pressures.

Various changes in details of construction and arrangement of parts may be made in the apparatus without departure from the principle and intended scope of my invention.

I claim—

1. In air-brake apparatus the combination with an air-compressor, main reservoir, brake-cylinder and engineer's valve, of train and main-reservoir pipes connecting the brake-cylinder and the main reservoir with the engineer's valve, and provided with couplings for separately connecting them with the corresponding pipes of other cars, substantially as and for the purposes set forth.

2. In air-brake apparatus the combination with an air-compressor, main reservoir, brake-cylinder, and engineer's valve, of an electric motor for actuating the air-compressor, an automatic controller having a fluid connection with the main reservoir for opening and closing the motor-circuit according to variations of the fluid-pressure, and a balancing-conductor for connecting said motor-circuit with the motor-circuit of other cars, substantially as and for the purposes set forth.

3. In air-brake apparatus the combination with an individual air-brake equipment, comprising an air-compressor, main reservoir, brake-cylinder and engineer's valve, of an electric motor for actuating said air-compressor, a switch for manually connecting said motor with the supply-conductor, an automatic controller having a fluid connection with the main reservoir for opening and closing the mortor-circuit according to variations in the fluid-pressure, and a balancing-conductor having a coupling for connecting said motor with the motor-circuit of another car between its motor and automatic controller, substantially as and for the purposes set forth.

4. In air-brake apparatus the combination of an air-compressor, a main reservoir connected with the compressor, a brake-cylinder, an auxiliary reservoir, engineer's valves, a main-reservoir pipe connected with the main reservoir and engineer's valves, and having cut-out cocks and couplings for connecting it with corresponding pipes on other cars, a train-pipe connected with said engineer's valves and having cut-out cocks and couplings for connecting it with corresponding pipes on other cars, and a triple valve connected with the train-pipe, brake-cylinder and auxiliary reservoir, substantially as and for the purposes set forth.

5. In air-brake apparatus the combination of an air-compressor, an electric motor for actuating said compressor, a main reservoir connected with the discharge of said compressor, an automatic controller having a fluid-actuating connection with the main reservoir and governing the supply of current to the motor according to main-reservoir pressure, a balancing-conductor connected with the motor-circuit and provided with means for connecting it with corresponding conductors on other cars, engineer's valves, a pipe connected with the main reservoir and with said engineer's valves, and provided with means for connecting it with corresponding pipes on other cars, a train-pipe connected with said engineer's valves and provided with means for connecting it with corresponding pipes on other cars, a brake-cylinder, an auxiliary reservoir and a triple valve having connections with the train-pipe, brake-cylinder and auxiliary reservoir and controlling communication between them, substantially as and for the purposes set forth.

6. In a complete air-brake equipment for a single railway-car, comprising an air-compressor, main reservoir, brake-cylinder and engineer's valves, a train-pipe connected with said brake-cylinder and engineer's valves and provided at the ends of the car with cut-out cocks and with couplings for connecting it with corresponding pipes on other cars, and a pipe connected with the main reservoir and engineer's valves and provided at the ends of the car with cut-out cocks and with couplings for connecting it with corresponding pipes and main reservoirs on other cars, substantially as and for the purposes set forth.

7. In a complete air-brake equipment for a single railway-car, comprising an electrically-actuated air-compressor, main reservoir, automatic controller adapted to stop and start said compressor according to main-reservoir pressure, and a switch for manually opening and closing the trolley connection of the compressor-motor, a balancing-conductor connected with the motor-circuit and provided at the ends of the car with means for connecting it with like conductors on other cars, substantially as and for the purposes set forth.

8. In air-brake apparatus the combination with a main reservoir, brake-cylinder and engineer's valve, of train and main-reservoir pipes connecting the brake-cylinder and the main reservoir with the engineer's valve, and provided with couplings for separately connecting them with corresponding pipes of other cars, substantially as and for the purposes set forth.

In witness whereof I hereto affix my signature in presence of two witnesses.

NIELS A. CHRISTENSEN.

Witnesses:
CHAS. L. GOSS,
E. H. BOTTUM.